United States Patent
Stavens et al.

(10) Patent No.: US 9,815,915 B2
(45) Date of Patent: Nov. 14, 2017

(54) PRODUCTION OF LIQUID POLYOLEFINS

(75) Inventors: Kevin B. Stavens, Houston, TX (US);
Aaron L. Wetterlind, League City, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 625 days.

(21) Appl. No.: 12/875,654

(22) Filed: Sep. 3, 2010

(65) Prior Publication Data

US 2012/0059207 A1  Mar. 8, 2012

(51) Int. Cl.
*C07C 2/02* (2006.01)
*C08F 10/00* (2006.01)
*C10M 107/10* (2006.01)

(52) U.S. Cl.
CPC .......... *C08F 10/00* (2013.01); *C10M 107/10* (2013.01); *C10M 2205/0285* (2013.01); *C10N 2230/02* (2013.01); *C10N 2240/02* (2013.01); *C10N 2240/04* (2013.01); *C10N 2240/08* (2013.01); *C10N 2240/12* (2013.01); *C10N 2240/14* (2013.01); *C10N 2240/30* (2013.01); *C10N 2250/10* (2013.01); *C10N 2270/00* (2013.01)

(58) Field of Classification Search
CPC .............................. C08F 10/14; C10M 107/10
USPC ....... 585/502, 520, 521, 522, 523, 820, 823, 585/809, 833
See application file for complete search history.

(56) References Cited

U.S. PATENT DOCUMENTS

| | | | |
|---|---|---|---|
| 2,849,429 A * | 8/1958 | Cines | C08F 10/00 159/DIG. 10 |
| 2,978,442 A | 4/1961 | Brightbill et al. | |
| 2,992,180 A * | 7/1961 | Schatz et al. | 585/429 |
| 3,149,178 A | 9/1964 | Hamilton et al. | |
| 3,164,578 A | 1/1965 | Baker et al. | |
| 3,172,736 A * | 3/1965 | Gee | B01F 3/0473 134/22.1 |

(Continued)

FOREIGN PATENT DOCUMENTS

| | | |
|---|---|---|
| EP | 0 277 004 | 8/1988 |
| EP | 0 277 007 | 8/1988 |

(Continued)

OTHER PUBLICATIONS

Bartels, et al., "Lubricants and Lubrication" in Ullmann's Encyclopedia of Industrial Chemistry, Wiley-VCH, 2003, available on-line Jan. 15, 2003.*

(Continued)

*Primary Examiner* — In Suk Bullock
*Assistant Examiner* — Aaron Pierpont
(74) *Attorney, Agent, or Firm* — Nancy T. Waldrip; Siwen Chen

(57) ABSTRACT

A method for preparing a liquid polyolefin includes contacting a feedstock comprising at least one olefin monomer with a catalyst system to produce a reactor effluent stream, filtering the reactor effluent stream, washing a created filter cake with a wash fluid comprising at least one hydrocarbon liquid; and recovering the liquid polyolefin. The catalyst system may be any conventional polyolefin catalyst system, and in a preferred embodiment, the catalyst system contains at least one activated metallocene catalyst. The reactor effluent stream comprises at least one liquid polyolefin, residual catalyst, and unreacted olefin monomer.

10 Claims, 3 Drawing Sheets

(56) References Cited

U.S. PATENT DOCUMENTS

| | | | |
|---|---|---|---|
| 3,382,291 | A | 5/1968 | Brennan |
| 3,742,082 | A | 6/1973 | Brennan |
| 3,769,363 | A | 10/1973 | Brennan |
| 3,780,128 | A | 12/1973 | Shubkin |
| 3,876,720 | A | 4/1975 | Heilman et al. |
| 3,883,417 | A | 5/1975 | Woo et al. |
| 4,016,349 | A | 4/1977 | McKenna |
| 4,132,663 | A | 1/1979 | Heilman et al. |
| 4,149,178 | A | 4/1979 | Estes |
| 4,172,855 | A | 10/1979 | Shubkin et al. |
| 4,180,575 | A | 12/1979 | Rochling et al. |
| 4,200,145 | A * | 4/1980 | Underwood ......... B01J 19/0013 165/143 |
| 4,239,930 | A | 12/1980 | Allphin et al. |
| 4,263,465 | A | 4/1981 | Sheng et al. |
| 4,263,712 | A | 4/1981 | Schroder |
| 4,367,352 | A | 1/1983 | Watts, Jr. et al. |
| 4,413,156 | A | 11/1983 | Watts, Jr. et al. |
| 4,434,408 | A | 2/1984 | Baba et al. |
| 4,451,684 | A | 5/1984 | Pasky |
| 4,469,912 | A | 9/1984 | Blewett et al. |
| 4,587,368 | A | 5/1986 | Pratt |
| 4,701,489 | A | 10/1987 | Hughes et al. |
| 4,704,491 | A | 11/1987 | Tsutsui et al. |
| 4,827,064 | A | 5/1989 | Wu |
| 4,827,073 | A | 5/1989 | Wu |
| 4,892,851 | A | 1/1990 | Ewen et al. |
| 4,910,355 | A | 3/1990 | Shubkin et al. |
| 4,912,272 | A | 3/1990 | Wu |
| 4,914,254 | A | 4/1990 | Pelrine |
| 4,926,004 | A | 5/1990 | Pelrine et al. |
| 4,950,822 | A | 8/1990 | Dileo et al. |
| 4,956,122 | A | 9/1990 | Watts et al. |
| 4,962,262 | A | 10/1990 | Winter et al. |
| 4,967,032 | A | 10/1990 | Ho et al. |
| 4,990,709 | A | 2/1991 | Wu |
| 4,990,771 | A | 2/1991 | Minoura et al. |
| 5,012,020 | A | 4/1991 | Jackson et al. |
| 5,017,299 | A | 5/1991 | Gutierrez et al. |
| 5,017,714 | A | 5/1991 | Welborn, Jr. |
| 5,068,487 | A | 11/1991 | Theriot |
| 5,087,788 | A | 2/1992 | Wu |
| 5,177,276 | A | 1/1993 | Beach et al. |
| 5,186,851 | A | 2/1993 | Gutierrez et al. |
| 5,188,724 | A | 2/1993 | Heilman et al. |
| 5,220,100 | A | 6/1993 | Massie et al. |
| 5,264,642 | A | 11/1993 | Wu |
| 5,369,196 | A | 11/1994 | Matsumoto et al. |
| 5,382,739 | A | 1/1995 | Atkins et al. |
| 5,462,995 | A | 10/1995 | Hosaka et al. |
| 5,498,815 | A | 3/1996 | Schaerfl, Jr. et al. |
| 5,552,504 | A | 9/1996 | Bennett et al. |
| 5,637,400 | A | 6/1997 | Brekner et al. |
| 5,679,812 | A | 10/1997 | Winter et al. |
| 5,688,887 | A | 11/1997 | Bagheri et al. |
| 5,690,832 | A | 11/1997 | Tavlarides et al. |
| 5,705,577 | A | 1/1998 | Rossi et al. |
| 5,731,254 | A | 3/1998 | Winter et al. |
| 5,811,379 | A | 9/1998 | Rossi et al. |
| 5,846,896 | A | 12/1998 | Ewen |
| 5,852,143 | A | 12/1998 | Sishta et al. |
| 5,859,159 | A | 1/1999 | Rossi et al. |
| 6,043,401 | A | 3/2000 | Bagheri et al. |
| 6,087,307 | A | 7/2000 | Kaminski et al. |
| 6,133,209 | A | 10/2000 | Rath et al. |
| 6,147,271 | A | 11/2000 | Strebel et al. |
| 6,180,575 | B1 | 1/2001 | Nipe |
| 6,388,032 | B1 | 5/2002 | Yamaura et al. |
| 6,414,090 | B2 | 7/2002 | Minami et al. |
| 6,414,091 | B2 | 7/2002 | Moritomi et al. |
| 6,479,722 | B1 | 11/2002 | De Wet et al. |
| 6,548,723 | B2 | 4/2003 | Bagheri et al. |
| 6,548,724 | B2 | 4/2003 | Bagheri et al. |
| 6,642,169 | B2 | 11/2003 | Weatherhead |
| 6,646,174 | B2 | 11/2003 | Clarembeau |
| 6,706,828 | B2 | 3/2004 | DiMaio |
| 6,713,438 | B1 | 3/2004 | Baillargeon et al. |
| 6,824,671 | B2 | 11/2004 | Goze et al. |
| 6,858,767 | B1 * | 2/2005 | DiMaio ................ C08F 10/00 585/511 |
| 6,960,700 | B1 | 11/2005 | Sethna et al. |
| 7,060,768 | B2 | 6/2006 | Brookhart et al. |
| 7,129,197 | B2 | 10/2006 | Song et al. |
| 7,473,815 | B2 | 1/2009 | Lambert et al. |
| 7,544,850 | B2 | 6/2009 | Goze et al. |
| 7,547,811 | B2 | 6/2009 | Kramer et al. |
| 7,592,497 | B2 | 9/2009 | Yang et al. |
| 7,601,256 | B2 | 10/2009 | Beall |
| 2001/0041817 | A1 | 11/2001 | Bagheri et al. |
| 2001/0041818 | A1 | 11/2001 | Bagheri et al. |
| 2003/0055184 | A1 | 3/2003 | Song et al. |
| 2004/0022508 | A1 | 2/2004 | Belardi et al. |
| 2004/0033908 | A1 | 2/2004 | Deckman et al. |
| 2004/0087746 | A1 | 5/2004 | Razavi |
| 2004/0097772 | A1 | 5/2004 | Deckers et al. |
| 2004/0147693 | A1 | 7/2004 | DiMaio |
| 2004/0220359 | A1 | 11/2004 | Abhari et al. |
| 2004/0230016 | A1 | 11/2004 | Blackbrow et al. |
| 2005/0059563 | A1 | 3/2005 | Sullivan et al. |
| 2005/0101761 | A1 | 5/2005 | Lambert et al. |
| 2005/0183988 | A1 | 8/2005 | Freerks et al. |
| 2007/0000807 | A1 | 1/2007 | Wu et al. |
| 2007/0011832 | A1 | 1/2007 | Keidel et al. |
| 2007/0043248 | A1 * | 2/2007 | Wu et al. ..................... 585/521 |
| 2007/0208151 | A1 * | 9/2007 | Okada et al. ................ 526/226 |
| 2008/0020928 | A1 * | 1/2008 | Wu ........................ C08F 6/02 502/400 |
| 2008/0053873 | A1 * | 3/2008 | Kosover et al. ........... 208/262.1 |
| 2009/0005279 | A1 | 1/2009 | Wu et al. |
| 2009/0156874 | A1 | 6/2009 | Patil et al. |
| 2009/0281360 | A1 * | 11/2009 | Knowles et al. ............... 585/12 |
| 2010/0069687 | A1 | 3/2010 | Kosover et al. |

FOREIGN PATENT DOCUMENTS

| | | |
|---|---|---|
| EP | 0 284 708 | 10/1988 |
| EP | 0 321 852 | 6/1989 |
| EP | 0 349 276 | 1/1990 |
| EP | 0 377 306 | 7/1990 |
| EP | 0 403 866 | 12/1990 |
| EP | 0 513 380 | 11/1992 |
| EP | 0 613 873 | 9/1994 |
| EP | 0 680 942 | 11/1995 |
| EP | 0 930 320 | 7/1999 |
| EP | 0 992 517 | 4/2000 |
| EP | 1 028 128 | 8/2000 |
| EP | 1 309 633 | 5/2003 |
| EP | 1 342 707 | 9/2003 |
| EP | 1 607 415 | 12/2005 |
| GB | 938069 | 9/1963 |
| IN | 191553 | 12/2003 |
| JP | 6336590 | 12/1994 |
| JP | 2005-200446 | 7/2005 |
| WO | 96/23751 | 8/1996 |
| WO | 99/67347 | 12/1999 |
| WO | 00/58423 | 10/2000 |
| WO | 02/14384 | 2/2002 |
| WO | 03/009136 | 1/2003 |
| WO | 03/051943 | 6/2003 |
| WO | 03/071369 | 8/2003 |
| WO | 03/104292 | 12/2003 |
| WO | 2004/046214 | 6/2004 |
| WO | 2007/011459 | 1/2007 |
| WO | 2007/011462 | 1/2007 |
| WO | 2007/011832 | 1/2007 |
| WO | 2007/011973 | 1/2007 |
| WO | 2007/145924 | 12/2007 |
| WO | 2007/146081 | 12/2007 |
| WO | 2008/010862 | 1/2008 |
| WO | 2008/010865 | 1/2008 |

(56) References Cited

FOREIGN PATENT DOCUMENTS

| WO | 2009/017953 | 2/2009 |
|---|---|---|
| WO | 2009/137264 | 11/2009 |

OTHER PUBLICATIONS

Bartels, et. al., "Lubricants and Lubrication" in Ullmann's Encyclopedia of Industrial Chemistry, Wiley-VCH, 2003, available on-line Jan. 15, 2003.*

J. Brennan, "*Wide-Temperature Range Synthetic Hydrocarbon Fluids*", Ind. Eng. Chem. Prod. Res. Dev., 1980, vol. 19, pp. 2-6.

K. Denbigh, "*The Kinetics of Continuous Reaction Processes: Application to Polymerization*", J. Applied Chem, 1951, vol. 1, pp. 227-236.

K. Denbigh, "*Continuous Reactions: Part II. The Kinetics of Steady State Polymerisation*", Trans Faraday Soc., 1947, vol. 43, pp. 648-660.

A. Munoz-Escalona et al., "*Single-Site Supported Catalysts for Ethylene Polymerization*", Metallocene Tech., 1999, pp. 2242-2246.

Z. Fan et al., "*Effect of Ethoxy- and Methoxysilane Donors in Propene/1-Hexene Copolymerization With High-Yield Supported Ziegler-Natta Catalysts*", Macromolecular Chemistry and Physics, 1994, vol. 195, pp. 3889-3899.

G. Gokel ed, Dean's Handbook of Organic Chemistry, 2nd Edition, McGraw-Hill, 2004, available on-line at hhtp://knovel.com.

M. LeVan et al. "*Adsorption and Ion Exchange*" Perry's Chemical Engineer's Handbook, 7th ed. 1997 pp. 16-1-16-66.

O. Levenspiel, "*Ch. 7 Design for Multiple Reactions*", Chemical Reaction Engineering, 2nd ed., 1972, pp. 196-209.

N. Naga et al., "*Effect of Co-Catalyst System on a-Olefin Polymerization With Rac- and Meso-[Dimethylsilylenebis(2,3,5-Trimethyl-Cyclopentadienyl)]Zirconium Dichloride*", Macromol. Rapid Commun., 1997, vol. 18, pp. 581-589.

N. Naga et al, "*Polymerization Behavior of a-Olefins With Rac- and Meso-Type Ansa-Metallocene Catalysts: Effects of Cocatalyst and Metallocene Ligand*", Macromolecular Chemistry Physics, 1999, vol. 200, pp. 1587-1594.

F. Rodriguez, "*The Molecular Weight of Polymers*", Principles of Polymer Systems, 1970, Chapter 6, pp. 115-144.

M. Sacchi et al., "*Use of Different Alkoxysilanes As External Donors in $MgCl_2$-Supported Ziegler-Natta Catalysts to Obtain Propene/1-Butene Copolymers With Different Microstructure*", Macromolecular Chemistry and Physics, 1994, vol. 195, pp. 2805-2816.

T. Seraidaris et al., "*High-Molar-Mass Polypropene with Tunable Elastic Properties by Hafnocene/Borate Catalysts*", Journal of Polymer Science: Part A: Polymer Chemistry, 2006, vol. 44, pp. 4743-4751.

J. Wills, "*Synthetic Lubricants*", Lubrication Fundamentals, Marcel Dekker Inc., New York, 1980, pp. 75-80.

"*Mobil Releases SuperSyn PAOs*", Lubrication Engineers, 1999, vol. 55, Part 8, pp. 45.

TIBA data, "*TIBA datasheet*" available on-line at www.albermarle.com on Aug. 26, 2010.

* cited by examiner

PRODUCTION OF LIQUID POLYOLEFINS

FIELD OF THE INVENTION

The invention relates to the production of lubricant base stocks. More specifically, the present invention is directed to the preparation of polyolefins wherein the recovery of the polyolefin is maximized by an improved filtering and filter cake wash method.

BACKGROUND OF THE INVENTION

Efforts to improve upon the performance of natural mineral oil-based lubricants by the synthesis of oligomeric hydrocarbon fluids have been the subject of important research and development in the petroleum industry for at least fifty years. These efforts have led to the relatively recent market introduction of a number of synthetic lubricants. In terms of lubricant property improvement, the thrust of the industrial research efforts involving synthetic lubricants have been towards fluids exhibiting useful viscosities over a wide temperature range, i.e., improved viscosity index (VI), while also showing lubricities, thermal and oxidative stabilities and pour points equal to or better than those for mineral oil.

Poly-alphaolefins (PAOs) comprise a class of hydrocarbons manufactured by the catalytic oligomerization (polymerization to low-molecular-weight products) of linear α-olefin (LAO) monomers. These typically range from 1-octene to 1-dodecene, with 1-decene being a preferred material, although oligomeric copolymers of lower olefins such as ethylene and propylene may also be used, including copolymers of ethylene with higher olefins as described in U.S. Pat. No. 4,956,122 and the patents referred to therein. PAO products have achieved importance in the lubricating oil market. Typically there are two classes of synthetic hydrocarbon fluids (SHF) produced from linear alpha-olefins, the two classes of SHF being denoted as PAO and HVI-PAO (high viscosity index PAO's). PAO's and HVI-PAO's of different viscosity grades are typically produced using promoted $BF_3$ or $AlCl_3$ catalysts.

Synthetic PAOs have found wide acceptability and commercial success in the lubricant field for their superiority to mineral based lubricants. In terms of lubricant property improvement, industrial research efforts on synthetic lubricants have led to PAO fluids exhibiting useful viscosities over a wide range of temperature, i.e., improved viscosity index, while also showing lubricity, thermal and oxidative stability and pour point equal to or better than mineral oil. These relatively new synthetic lubricants lower mechanical friction, enhancing mechanical efficiency over the full spectrum of mechanical loads and do so over a wider range of operating conditions than mineral oil lubricants.

One benefit of premium lubricants is the potential for extended life, reducing the change-out interval. Extended lubricant life is one feature that offsets the higher initial fill cost for premium lubricants. In order to achieve an extended lubricant life, premium lubricants must demonstrate a more stable viscosity in service. Using higher quality base stocks and advanced additive systems, these lubricants counter the effects of thermal, oxidative and hydrolytic attack.

The use of single-site metallocene catalysts in the oligomerization of various alphaolefin feeds is known per se, such as in WO2007/011832, WO2007/011459, and WO2007/011973. To date however, PAOs made with metallocenes have yet to find wide applicability in the marketplace, particularly the lubricant marketplace, due to inefficient process, cost and property deficits. The instant invention address such and other needs by providing metallocene catalyst produced PAOs manufactured by improved processes and equipment.

SUMMARY OF THE INVENTION

The invention is directed to a process for the preparation of lubricant base stocks wherein the recovery of the polyolefin is maximized by an improved filtering and filter cake wash method.

Disclosed herein is a method for preparing a liquid polyolefin, the method comprising: contacting a feedstock comprising at least one olefin monomer with a catalyst system to produce a reactor effluent stream, filtering the reactor effluent stream, washing a created filter cake with a wash fluid comprising at least one hydrocarbon liquid; and recovering the liquid polyolefin that was within the filter cake. The catalyst system may be any conventional polyolefin catalyst system, and in a preferred embodiment, the catalyst system contains at least one activated metallocene catalyst. The reactor effluent stream comprises at least one liquid polyolefin, residual catalyst, and unreacted olefin monomer.

The hydrocarbon liquid in the filter cake wash fluid is at least one $C_6$ to $C_{30}$ hydrocarbon liquid. In one disclosed aspect, the hydrocarbon liquid in the wash fluid corresponds to the liquid olefin monomers used to produce the liquid polyolefin product. In one embodiment, the wash fluid consists of only liquids that are also employed as feedstocks in the process to produce the polyolefin; by employing only feedstock liquids as the filter cake wash fluid, the used wash fluid may be recycled to the reactor and reduce the consumption of hydrocarbon liquids and other liquids in the system.

In one aspect of the invention, after the filter cake is washed, the cake is substantially free of the liquid polyolefin. In another aspect of the invention, the washed filter cake contains not more than 1000 ppm of the polyolefin. Thus, upon disposal of the used filter cake, none of the valuable polyolefin product is disposed of and full recovery of the product produced is obtained.

In one aspect of the invention, the feedstock monomers are selected from $C_6$ to $C_{30}$ olefins. The feedstock may be a mixed feedstock comprising two or more $C_6$ to $C_{30}$ alpha-olefins.

Also disclosed is a catalyst system comprising a single site metallocene catalyst, an NCA activator, and a trialkyl aluminum co-activator.

The disclosed process may further including the steps of, prior to filtering, contacting the reactor effluent stream with a deactivator to deactivate the residual catalyst to produce a deactivated reactor effluent stream; and contacting the deactivated reactor effluent stream with a sorbent, wherein the sorbent is capable of chemically and physically interacting with the residual catalyst.

Also disclosed herein are multiple tank reactors that are useful in the disclosed polymerization/oligomerization. The tank reactors do not require or contain an internal agitator to obtain the desired mixing of the reactor contents. Each reactor has at least one spray nozzle located in a strategic location and a recirculating pump to create the desired mixing.

The resulting liquid polyolefin, a liquid polyalphaolefin has use as a lubricant and a lubricant basestock in different types of lubricating compounds. Such lubricants include gear oils, bearing oils, circulating oils, compressor oils, hydraulic oils, turbine oils, or machinery greases. Such lubricants are useful in wet gearboxes, clutch systems, blower bearings, wind turbine gear boxes, coal pulverizer drives, cooling tower gear boxes, kiln drives, paper machine drives, or rotary screw compressors.

BRIEF DESCRIPTION OF THE FIGURES

The invention will be described by way of example and with reference to the accompanying drawings in which:

FIG. 1 to 3A are alternative embodiments of tank reactor.

DETAILED DESCRIPTION OF THE INVENTION

Figure 1:
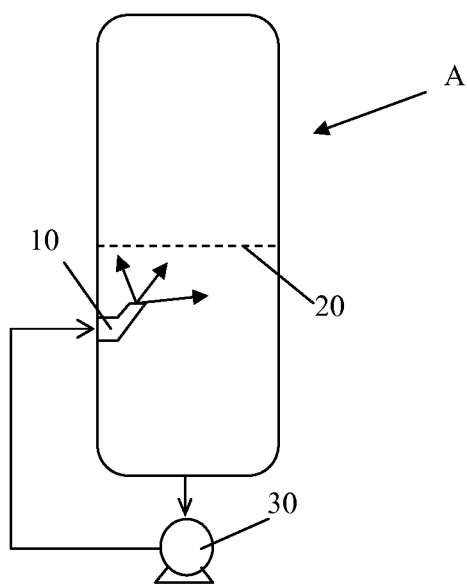

The present invention is directed toward improved processes to manufacture a PAO using a metallocene catalyst system, with alternative tank reactor designs and an improved filter cake wash system wherein the productivity/recovery of the PAO is increased, the use of preferred feedstock streams are enhanced, and wash water is eliminated from the system.

While the illustrative embodiments have been described with particularity, it will be understood that various other modifications will be apparent to and can be readily made by those skilled in the art without departing from the spirit and scope of the invention. Accordingly, it in not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

For the purposes of this invention, a "liquid" is defined to be a fluid that has no distinct melting point above 25° C., and has a kinematic viscosity at 100° C. of 5000 cSt or less, preferably 3000 cSt or less and/or a kinematic viscosity at 40° C. of 200,000 cSt or less, preferably 100,000 cSt or less.

For purposes of this disclosure, and for the general understanding of viscosity values of polyalphaolefins, when a polyalphaolefin is defined as having a kinematic viscosity at a certain value, due to minor variations in the oligomerization or polymerization of the product, the actual measurable viscosity may be within ±10% cSt. Thus, a PAO may be described as being a 150 cSt PAO and the actual measured viscosity may be 135 or 165. This is well known and understood by those in the art.

Feedstocks

PAOs comprise a well-known class of liquid hydrocarbons manufactured by the catalytic oligomerization (polymerization to low-molecular-weight products) of olefins, preferably alpha-olefins, preferably linear alpha-olefin monomers. The monomers typically range from 1-hexene to 1-tetradecene, although 1-decene is typically preferred. However, production of PAOs is not limited to pure 1-decene as feed, but may be produced by a wide range of mixed alpha-olefins as feed, including feeds comprising one or more of 1-hexene, 1-octene, 1-decene, 1-dodecene, and 1-tetradecene.

By "mixture" of alpha-olefins, it is meant that at least two different alpha-olefins are present in the feed. In embodiments where the feed is selected from $C_5$ to $C_{30}$ α-olefins, the feed will comprise anywhere from 2 to 25 different α-olefins. Thus, the feed may comprise at least two, or at least three, or at least four, or at least five, or at least six, or at least seven, or at least eight, and so on, different feeds. The embodiments may be further characterized by having no single α-olefin present in an amount greater than 80 wt %, 60 wt %, 50 wt %, or 49 wt %, or 40 wt %, or 33 wt %, or 30 wt %, or 25 wt %, or 20 wt %.

The amounts of a particular α-olefin present in a feed will be specified herein as percent by weight of the entire amount of α-olefin in the feed, unless otherwise specified. Thus, it will be recognized that the feed may also comprise an inert (with respect to the oligomerization reaction in question) material, such as a carrier, a solvent, or other olefin components present that is not an α-olefin. Examples are propane, n-butane, iso-butane, cis- or trans-2-butenes, iso-butenes, and the like, that maybe present with propylene or with 1-butene feed. Other examples are the impurity internal olefins or vinylidene olefins that are present in the α-olefin feed.

Feeds may be advantageously selected from $C_5$ to $C_{24}$ α-olefins, $C_5$ to $C_{18}$, $C_5$ to $C_{16}$, $C_6$ to $C_{20}$ α-olefins, $C_5$ to $C_{14}$ α-olefins, $C_5$ to $C_{16}$ α-olefins, $C_5$ to $C_{16}$ α-olefins, $C_6$ to $C_{16}$ α-olefins, $C_6$ to $C_{18}$ α-olefins, $C_6$ to $C_{14}$ α-olefins, among other possible α-olefin feed sources, such as any lower limit listed herein to any upper limit listed herein. In other embodiments, the feed will comprise at least one monomer selected from propylene, 1-butene, 1-pentene, 1-hexene to 1-heptene and at least one monomer selected from $C_{12}$-$C_{18}$ alpha-olefins. In any embodiment of the feedstock to manufacture the polyalphaolefin, the amount of ethylene is not more than 10 mol %.

When employing a mixed feed, one acceptable mixed feed is any mixture of 1-hexene, 1-octene, 1-decene, 1-dodecene, and 1-tetradecene. Mixtures in all proportions may be used, e.g., from about 1 wt % to about 90 wt % 1-hexene, from about 1 wt % to about 90 wt % 1-octene, from about 1 wt % to about 90 wt % 1-decene, from about 1 wt % to about 90 wt % 1-dodecene, and from about 1 wt % to about 90 wt % tetradecene. In preferred embodiments, 1-hexene is present in the amount of about 1 wt % or 2 wt % or 3 wt % or 4 wt % or 5 wt % to about 10 wt % or 20 wt %, 1-octene is present in amount of 40 wt %, 50 wt %, or 60 wt % to about 70 wt %, 75 wt %, 80 wt %, 85 wt %, 90 wt %, or 95 wt %, 1-decene is present in the amount of about 25 wt % or 30 wt %, or 40 wt %, or 50 wt % to about 60 wt % or 70 wt % or 75 wt %, 1-dodecene is present in the amount of about 10 wt % or 20 wt % or 25 wt % or 30 wt % or 40 wt % to about 45 wt % or 50 wt % or 60 wt %, and 1-tetradecene is present in the amount of 1 wt % or 2 wt % or 3 wt % or 4 wt % or 5 wt % or 10 wt % or 15 wt % or 20 wt % or 25 wt % to about 30 wt % or 40 wt % or 50 wt %. Ranges from any lower limit to any higher limit just disclosed are contemplated, e.g., from about 3 wt % to about 10 wt % 1-hexene or from about 2 wt % to about 20 wt % 1-hexene, from about 40 to 95% 1-octene, from about 25 wt % to about 70 wt % 1-decene or from about 40 wt % to about 70 wt % 1-decene, from about 10 wt % to about 45 wt % 1-dodecene or from about 25 wt % to about 50 wt % 1-dodecene, and from about 5 wt % to about 30 wt % 1-tetradecene or from about 15 wt % to about 50 wt % 1-tetradecene. Numerous other ranges are contemplated, such as ranges plus or minus 5% (±5%) from those specified in the examples.

While minor proportions of other linear alphaolefins (α-olefin) may be present, in the above embodiments the mixed feed (or mixture of alphaolefins contacting the oligomerization catalyst and promoters) consists essentially of 1-hexene, 1-octene, 1-decene, 1-dodecene, and/or 1-tetradecene, wherein the phrase "consists essentially of" (or "consisting essentially of" and the like) takes its ordinary meaning, so that no other α-olefin is present (or for that matter nothing else is present) that would affect the basic and novel features of the present invention. In yet another preferred embodiment the feed (or mixture of alphaolefins) consists of 1-hexene, 1-octene, 1-decene, 1-dodecene, and/or 1-tetradecene, meaning that no other olefin is present (allowing for inevitable impurities).

Another mixed feedstock useful in the present invention is a mixed feed of 1-hexene, 1-decene, and 1-tetradecene. Mixtures in all proportions may be used, e.g., from about 1 wt % to about 90 wt % 1-hexene, from about 1 wt % to about 90 wt % 1-decene, and from about 1 wt % to about 90 wt %. In preferred embodiments, the 1-hexene is present in amounts of 1 wt % or 2 wt % or 3 wt % or 4 wt % or 5 wt % to about 10 wt %, 20 wt %, 25 wt %, or 30 wt %, 1-decene is present in the amount of about 25 wt % or 30 wt %, or 40 wt %, or 50 wt % to about 60 wt % or 70 wt % or 75 wt %, and 1-tetradecene is present in the amount of 1 wt % or 2 wt % or 3 wt % or 4 wt % or 5 wt % or 10 wt % or 15 wt % or 20 wt % or 25 wt % to about 30 wt % or 40 wt %. Ranges from any lower limit to any higher limit just disclosed are contemplated.

Mixed feedstocks of two LOA's are also contemplated by the present invention. Such two component feedstocks may be blends of 1-hexene and 1-decene, 1-hexene and 1-dodecene, 1-decene and 1-dodecene, 1-decene and 1-tetradecene, or 1-dodecene and 1-tetradecene. For such two α-olefin mixed feedstocks, either component may be present in amounts of 1-99 wt %, with preferred ranges for both components being in the ranges of 10 to 90 wt %, 15 to 85 wt %, 20 to 80 wt %, or 30 to 70 wt %.

In other embodiments the olefin feed consists essentially of a single α-olefin such as 1-decene or 1-dodecene.

Particularly advantaged feedstocks include alpha-olefins derived from an ethylene growth process, from Fischer-Tropsch synthesis, from steam or thermal cracking processes, syn-gas synthesis, C4 stream containing 1-butene from refinery operation, such as Raff-1 or Raff-2 stream, and so forth. The α-olefin made from ethylene growth processes contains only even-number olefins. α-olefin containing both even- and odd-number olefins can also be made from steam cracking or thermal cracking of wax, such as petroleum wax, Fischer-Tropsch wax, or any other readily available hydrocarbon wax. α-olefin can also be made in a Fischer-Tropsch synthesis process. α-olefin made directly from syngas synthesis processes, which can produce significant amounts of $C_3$-$C_{15}$ alpha-olefins, containing both even- and odd-number olefins.

In an embodiment, it is advantageous to use a high quality feed with minimal inert material. However, α-olefin containing other inert components, including saturated hydrocarbons, internal or vinylidene olefins or aromatic diluents can also be used as feed. In this case, the α-olefin would be reacted to give polymer and inert components will be passed through the reactor unaffected. The polymerization process is also a separation process.

In an embodiment, the olefins used in the feed are co-fed into the reactor. In another embodiment, the olefins are fed separately into the reactor. In either case, the catalyst/promoters may also be feed separately or together, with respect to each other and with respect to the α-olefin species.

Catalyst System

The catalyst system comprises a metallocene compound (Formula 1, below) together with an activator, optionally a co-activator, and optionally a scavenger.

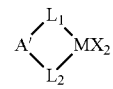

Formula 1

The term "catalyst system" is defined herein to mean a catalyst precursor/activator pair, such as a metallocene/activator pair. When "catalyst system" is used to describe such a pair before activation, it means the unactivated catalyst (precatalyst) together with an activator and, optionally, a co-activator (such as a trialkyl aluminum compound). When it is used to describe such a pair after activation, it means the activated catalyst and the activator or other charge-balancing moiety. Furthermore, this activated "catalyst system" may optionally comprise the co-activator and/or other charge-balancing moiety.

Metallocene Catalysts

The metallocene is selected from one or more compounds according to Formula 1, above. In Formula 1, M is selected from Group 4 transition metals, preferably zirconium (Zr), hafnium (Hf) and titanium (Ti), L1 and L2 are independently selected from cyclopentadienyl ("Cp"), indenyl, and fluorenyl, which may be substituted or unsubstituted, and which may be partially hydrogenated, A is an optional bridging group which if present, in preferred embodiments is selected from dialkylsilyl, dialkylmethyl, ethenyl (—$CH_2$—$CH_2$—), alkylethenyl (—$CR_2$—$CR_2$—), where alkyl can be independently hydrogen radical, $C_1$ to $C_{16}$ alkyl radical or phenyl, tolyl, xylyl radical and the like, and wherein each of the two X groups, $X^a$ and $X^b$, are independently selected from halides, OR(R is an alkyl group, preferably selected from $C_1$ to $C_5$ straight or branched chain alkyl groups), hydrogen, $C_1$ to $C_{16}$ alkyl or aryl groups, haloalkyl, and the like. Usually relatively more highly substituted metallocenes give higher catalyst productivity and wider product viscosity ranges and are thus often more preferred.

In using the terms "substituted or unsubstituted cyclopentadienyl ligand", "substituted or unsubstituted indenyl ligand", and "substituted or unsubstituted tetrahydroindenyl ligand", "substituted or unsubstituted fluorenyl ligand", and "substituted or unsubstituted tetrahydrofluorenyl or octahydrofluorenyl ligand" the substitution to the aforementioned ligand may be hydrocarbyl, substituted hydrocarbyl, halocarbyl, substituted halocarbyl, silylcarbyl, or germylcarbyl. The substitution may also be within the ring giving heterocyclopentadienyl ligands, heteroindenyl ligands or heterotetrahydoindenyl ligands, each of which can additional be substituted or unsubstituted.

For purposes of this invention and the claims thereto the terms "hydrocarbyl radical," "hydrocarbyl" and hydrocarbyl group" are used interchangeably throughout this document. Likewise the terms "group", "radical", and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic, and include substituted hydrocarbyl radicals, halocarbyl radicals, and substituted halocarbyl radicals, silylcarbyl radicals, and germylcarbyl radicals as these terms are defined below. Substituted hydrocarbyl radicals are radicals in which at least one hydrogen atom has been substituted with at least one functional group.

Halocarbyl radicals are radicals in which one or more hydrocarbyl hydrogen atoms have been substituted with at least one halogen (e.g., F, Cl, Br, I) or halogen-containing group (e.g., $CF_3$). Substituted halocarbyl radicals are radicals in which at least one halocarbyl hydrogen or halogen atom has been substituted with at least one functional group.

Silylcarbyl radicals (also called silylcarbyls) are groups in which the silyl functionality is bonded directly to the indicated atom or atoms. Germylcarbyl radicals (also called germylcarbyls) are groups in which the germyl functionality is bonded directly to the indicated atom or atoms. Polar radicals or polar groups are groups in which the heteroatom functionality is bonded directly to the indicated atom or atoms. They include heteroatoms of groups 1-17 of the Periodic Table either alone or connected to other elements by covalent or other interactions such as ionic, van der Waals forces, or hydrogen bonding.

Activators/Co-activators

Activators that may be used include aluminoxanes such as methyl aluminoxane, modified methyl aluminoxane, ethyl aluminoxane, iso-butyl aluminoxane and the like, or non-coordinating anions (NCAs) such as Lewis acid activators including triphenyl boron, tris-perfluorophenyl boron, tris-perfluorophenyl aluminum and the like, or ionic activators including dimethylanilinium tetrakis perfluorophenyl borate, triphenyl carbonium tetrakis perfluorophenyl borate, dimethylanilinium tetrakis perfluorophenyl aluminate, and the like.

For purposes of this invention and the claims thereto noncoordinating anion (NCA) is defined to mean an anion which either does not coordinate to the catalyst metal cation or that coordinates only weakly to the metal cation. An NCA coordinates weakly enough that a neutral Lewis base, such as an olefinically or acetylenically unsaturated monomer, can displace it from the catalyst center. Any metal or metalloid that can form a compatible, weakly coordinating complex with the catalyst metal cation may be used or contained in the noncoordinating anion. Suitable metals include, but are not limited to, aluminum, gold, and platinum. Suitable metalloids include, but are not limited to, boron, aluminum, phosphorus, and silicon. A subclass of non-coordinating anions comprises stoichiometric activators, which can be either neutral or ionic. The terms ionic activator, and stoichiometric ionic activator can be used interchangeably. Likewise, the terms neutral stoichiometric activator and Lewis acid activator can be used interchangeably.

A co-activator is a compound capable of alkylating the transition metal complex, such that when used in combination with an activator, an active catalyst is formed. Co-activators include aluminoxanes such as methyl aluminoxane, modified aluminoxanes such as modified methyl aluminoxane, and trialkyl aluminums such as trimethyl aluminum, tri-isobutyl aluminum, triethyl aluminum, and tri-isopropyl aluminum, tri-n-hexyl aluminum, tri-n-octyl aluminum, tri-n-decyl aluminum or tri-n-dodecyl aluminum. Co-activators are typically used in combination with Lewis acid activators and ionic activators when the pre-catalyst is not a dihydrocarbyl or dihydride complex. Sometimes co-activators are also used as scavengers to deactivate impurities in feed or reactors.

Other components used in the reactor system can include inert solvent, catalyst diluent, etc. These components can also be recycled during the operation.

Polymerization Process

The polymerization process according to the invention will typically be accomplished in a homogeneous or colloidal solution processes. Generally this involves polymerization or oligomerization in a continuous reactor in which the polymer formed and the starting feed according to the invention and catalyst materials according to the invention are agitated to reduce or avoid concentration or temperature gradients. Temperature control in the reactor is generally obtained by balancing the heat of polymerization and with reactor cooling by reactor jackets or cooling coils or a cooled side-stream of reactant to cool the contents of the reactor, auto refrigeration, pre-chilled feeds, vaporization of liquid medium (diluent, monomers or solvent) or combinations of all the above methods. Adiabatic reactors with pre-chilled feeds may also be used. The reactor temperature depends on the catalyst used and the product desired. Higher temperatures tend to give lower molecular weights and lower temperatures tend to give higher molecular weights, however this is not a hard and fast rule. In general, the reactor temperature preferably can vary between about 0° C. and about 300° C., more preferably from about 10° C. to about 250° C., and most preferably from about 25° C. to about 230° C. Usually, it is important to control the reaction temperature as pre-determined. In order to produce fluids with narrow molecular distribution, such as to promote the highest possible shear stability, it is useful to control the reaction temperature to obtain minimum of temperature fluctuation in the reactor or over the course of the reaction time. If multiple reactors are used in series or in parallel, it is useful to keep the temperature constant in a pre-determined value to minimize any broadening of molecular weight distribution. In order to produce fluids with broad molecular weight distribution, one can adjust the reaction temperature swing or fluctuation, or as in series operation, the second reactor temperature is preferably higher than the first reactor temperature. In parallel reactor operation, the temperatures of the two reactors are independent. Or one can use two types of metallocene catalysts.

While reaction conditions may generally be determined by one of ordinary skill in the art in possession of the present disclosure, typical conditions will now be discussed.

The pressure in any reactor used herein can vary typically from about 0.1 atmosphere to 100 atmosphere (10 kPa to 10,100 kPa), preferably from 0.5 atm to 75 atm (50 kPa to 7600 kPa), most preferably from 1.0 to 50 atm (101 kPa to 5066 kPa). The reaction can be carried out under the atmosphere of nitrogen or with some hydrogen. Sometimes a small amount of hydrogen is added to the reactor to improve the catalyst productivity. The amount of hydrogen is preferred to keep at such a level to improve catalyst productivity, but not induce any hydrogenation of olefins, especially the feed alpha-olefins because the conversion of alpha-olefins into saturated paraffins is very detrimental to the efficiency of the process. The amount of hydrogen partial pressure is preferred to be kept low, less than 100 psi (689 kPa), prefer less than 50 psi (345 kPa), preferably less than 25 psi (172 kPa), preferably less than 10 psi (69 kPa), preferably less than 5 psi (34 kPa), preferably less than 1 psi (6.9 kPa. In a particularly preferred embodiment in any of the process described herein the concentration of hydrogen in the reactant phase is less than 100 ppm, preferably less than 50 ppm, preferably less than 10 ppm, preferably less than 1 ppm. In a particularly preferred embodiment in any of the process described herein the concentration of hydrogen in the reactor is kept at a partial pressure of 200 psi (1379 kPa) or less, based upon the total pressure of the reactor, preferably 150 psi (1034 kPa) or less, preferably 100 psi (690 kPa) or less, preferably 50 psi (345 kPa) or less, preferably 10 psi (69 kPa) or less.

The reaction time or reactor residence time is usually dependent on the type of catalyst used, the amount of catalyst system used, and the desired conversion level. Different metallocenes have different activity. Usually, higher degree of alkyl substitution on the cyclopentadienyl ring, or bridging improves catalyst productivity. Catalysts such as 1,2,3,4-tetramethylcyclopentadienylzirconium dichloride or 1,2,4-tri methylcyclopentadienylzirconium dichloride, or pentamethylcyclopentadienyl zirconium dichloride or their dialkyl analogs have desirable high productivity and stability than unsubstituted metallocenes. Certain bridged and bridged with substitution catalysts, such as the di-halides or dialkyls of dimethylsilylbis[indenyl] zirconium or dimethylsilylbis[tetrahydro-indenyl]zirconium dimethylsilylbis[1-methylindenyl]zirconium or their hafnium analogs, etc. Usually the amount of catalyst components used is determinative. High amount of catalyst loading tends to gives high conversion at short reaction time. However, high amount of catalyst usage make the production process uneconomical and difficult to manage the reaction heat or to control the reaction temperature. Therefore, it is useful to choose a catalyst with maximum catalyst productivity to minimize the amount of metallocene and the amount of activators needed. When the catalyst system is metallocene plus methylalumoxane, the range of methylalumoxane used is typically in the range of 0.1 milligram (mg) to 500 mg/g of alpha-olefin feed. A more preferred range is from 0.05 mg to 10 mg/g of alpha-olefin feed. Furthermore, the molar ratios of the aluminum to metallocene (Al/M molar ration) range from 2 to 4000, preferably 10 to 2000, more preferably 50 to 1000, preferably 100 to 500. When the catalyst system is metallocene plus a Lewis Acid or an ionic promoter with NCA component, the metallocene use is typically in the range of 0.01 microgram to 500 micrograms of metallocene component/gram of alpha-olefin feed. Usually the preferred range is from 0.1 microgram to 100 microgram of metallocene component per gram of alpha-olefin feed. Furthermore, the molar ratio of the NCA activator to metallocene is in the range from 0.1 to 10, preferably 0.5 to 5, preferably 0.5 to 3. If a co-activator of alkylaluminum compound is used, the molar ratio of the Al to metallocene is in the range from 1 to 1000, preferably 2 to 500, preferably 4 to 400.

Typically it is preferred to have the highest possible conversion (close to 100%) of feed alpha-olefin in shortest possible reaction time. However, in CSTR operation, sometimes it is optimal to run the reaction at slightly less than 100% conversion. There are also occasions, when partial conversion is more desirable when the narrowest possible MWD of the product is desirable because partial conversion can avoid a MWD broadening effect. If the reaction is conducted to less than 100% conversion of the alpha-olefin, the unreacted starting material after separation from other product and solvents/diluents can be recycled to increase the total process efficiency.

Desirable residence times for any process described herein may likewise be determined by one of ordinary skill in the art in possession of the present disclosure, and will typically range from 1 minutes to 20 hours, or more typically 5 minutes to 10 hours. See, for instance, U.S. Pat. No. 5,705,577 for typical process conditions.

Each of these processes may also be employed in single reactor, parallel or series reactor configurations. The liquid processes comprise contacting olefin monomers with the above described catalyst system, preferably in a suitable diluent, solvent, recycle, or mixture thereof, and allowing the reaction to occur for a sufficient time to produce the desired polymers or oligomers. Hydrocarbon solvents both aliphatic and aromatic are suitable. Aromatics such as benzene, toluene, xylenes, ethylbenzene, propylbenzene, cumene, t-butylbenzene are suitable. Alkanes, such as hexane, heptane, pentane, isopentane, and octane, Norpar™ fluids or Isopar™ fluids from ExxonMobil Chemical Company in Houston, Tex. are also suitable. Generally, toluene is most suitable to dissolve catalyst components. Norpar fluids or Isopar fluids or hexanes (or mixtures thereof) are preferred as reaction diluents. Oftentimes, a mixture of toluene and Norpar fluids or Isopar fluids is used as diluent or solvent.

In other embodiments, the process can be advantageously carried out in a conventional continuous stirred tank reactor, a batch reactor, or plug flow reactor, or more than one reactor operated in series or parallel. These reactors may have or may not have internal cooling and the monomer feed may or may not be refrigerated.

A typical continuous stirred tank reactor has an internal agitator at the bottom of the reactor to continuously mix the reactor contents. However, constant movement of the reactor contents in a tank reactor may be achieved by other means that does not require an internal agitator, including those illustrated in FIGS. 1 to 3. Reactor A, see FIG. 1, has at least one jet spray nozzle 10 for injecting fluid into the reactor A. The jet spray nozzle 10 is positioned below the minimum liquid level 20 of the tank; as fluid is injected into the reactor A, the fluid is put into motion. At the bottom of the reactor A, an outlet feeds to a high volume recirculating pump 30 that recirculates the fluid back into the reactor A via the jet spray nozzles 10. The volume of the jet spray nozzle 10, and the number of jet spray nozzles 10 may be optimized to achieve a desired turbulence, or agitation level, in the reactor.

Figure 2:
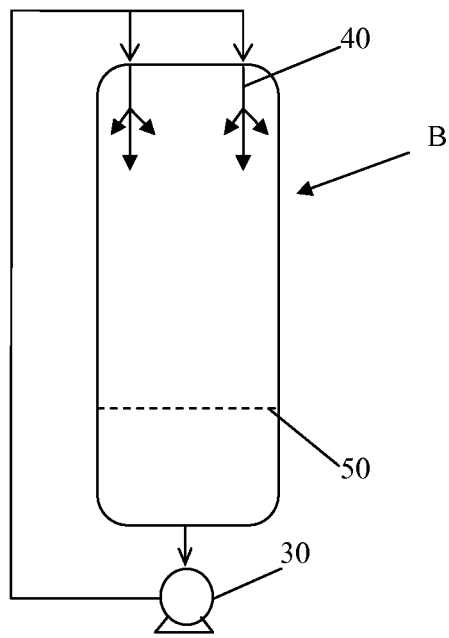

An alternative reactor B may be provided with multiple spray nozzles 40, see FIG. 2. The spray nozzles 40 are illustrated at the top of the tank; however, the nozzles 40 may be located at any point above the liquid level 50 in the tank. The nozzles 40 are sized and selected to force the incoming fluid to create sufficient agitation in the reactor fluid contents. As with reactor A, at the bottom of the reactor B, an outlet feeds to a high volume recirculating pump 30 for recirculating fluid back into the reactor B.

Figure 3A:
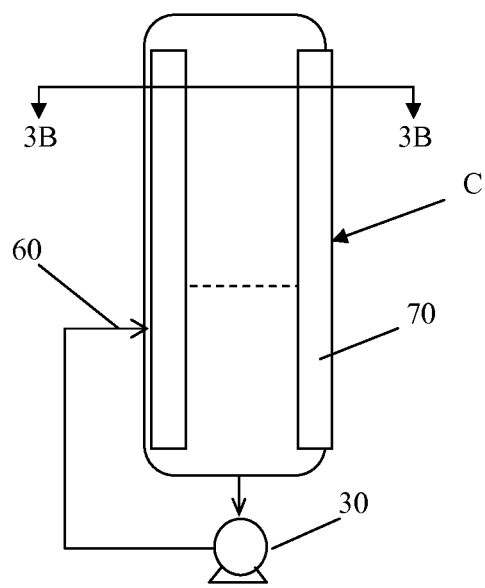
Figure 3B:
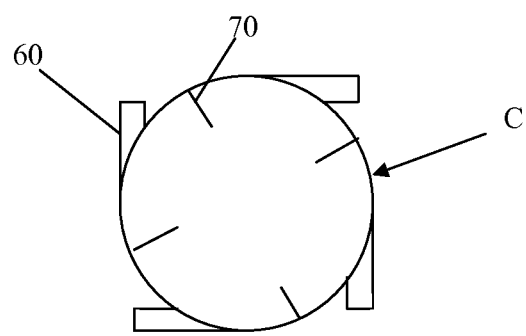
FIG. 3B is a cross-sectional view of the reactor tank of FIG. 3A.

In alternative reactor C, agitation of the fluid is provided by a combination of tangential inlet spray nozzles 60 and vertical internal baffles 70, see FIGS. 3A and 3B. The spray nozzles 60 and baffles 70 are oriented such that the fluid exiting the spray nozzles 60 is directed to the side of the baffles 70, creating agitation of the incoming fluid. The reactor C is illustrated with four sets of spray nozzles 60 and baffles 70; however, this number, as well as the size of the spray nozzles 60 may be varied to achieve the desired liquid agitation in the reactor C.

Lube Product Isolation

Figure 4:
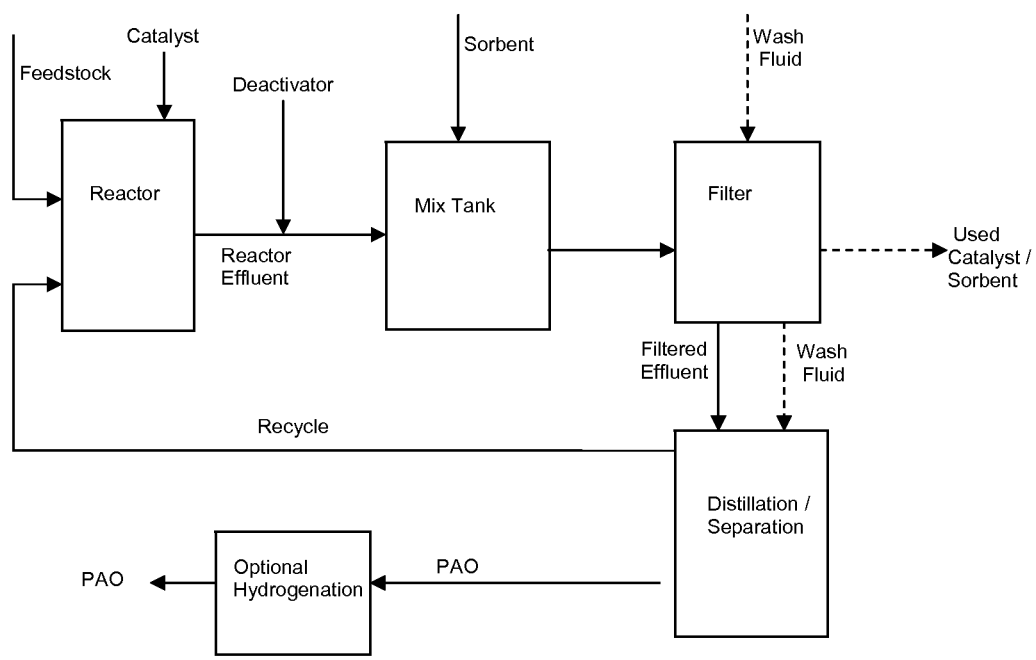
FIG. 4 is a simplified flow diagram of manufacturing process.

When the polymerization or oligomerization reaction is progressed to the pre-determined stage, ranging anywhere from 50% to 95%, even up to 99%, alpha-olefin conversion, the reactor effluent is withdrawn from the reactor, see FIG. 4. The reactor effluent comprises the polyolefin product, residual catalyst, and unreacted olefin, and may further contain compounds considered inerts such as internal olefins, branched olefins, and paraffins that entered the system via the feedstock or reaction in the reactor. The term "residual catalyst" as used herein will include unreacted catalyst precursor, if any, unreacted activated catalyst and various forms of the catalyst which may be formed during the reaction, as well as any unused co-activator. The reactor effluent may also contain one or more other solvents, such as benzene, toluene, xylenes, ethylbenzene, cumene, n-propylbenzene, other one-ring aromatics or paraffin solvents, and scavengers added to the reactor.

Prior to or concurrent with entry into a mix tank, the effluent may be treated to deactivate the residual catalyst and, if necessary, any co-activator and scavenger. Deactivation is typically accomplished by introduction of air, $CO_2$ or water or other deactivator. This may be either in an adjacent deactivation vessel or the deactivation agent may be fed into the effluent pipe under conditions of static mixing. The effluent comprising the deactivated residual catalyst may be referred to as "deactivated effluent".

Removal of the catalyst from the deactivated effluent stream begins in the mix tank, see FIG. 4. At least one solid sorbent having an active surface area and pore volume capable of absorbing the catalyst components is mixed with the deactivated effluent. Typical examples of suitable solid sorbents are natural or synthetic clay, modified clay, diatomaceous earth, activated charcoal, silica gel, alumina, aluminosilicate, zeolites, molecular sieves, cellulose material, metal oxides or metal salts, such as calcium oxides, magnesium oxides, titanium oxides, zirconium oxides, aluminum oxides, activated or treated in appropriate manners. Generally the sorbent should have a surface area greater than 0.1 $m^2$/gram and with a pore volume greater than 0.01 cc/gram. The sorbent may be introduced to the deactivated effluent in either dry form or it may be pre-blended with a hydrocarbon fluid to form a sorbent slurry. When slurried, the hydrocarbon fluid may be any suitable non-reactive hydrocarbon fluid; a "non-reactive" hydrocarbon fluid as used herein in the filtering step of the process is a fluid that does not react with any of the sorbent or components of the deactivated effluent stream. The hydrocarbon fluid may be any $C_6$ to $C_{30}$ fluid; and is preferably selected to correspond to a fluid that forms part of the feedstock to the reactor or is used as a catalyst diluent.

The solid sorbent may have both chemical and physical active sites to interact with the catalyst components. Such solid sorbents having surface hydroxyl or oxygen groups thereon yield chemical reactions with the catalysts thereby providing strong sorption of the catalyst components by the sorbent and facilitating the high degree of catalyst removal. The sorbent may also act as catalyst poison to deactivate the polymerization reaction; if the sorbent contains a sufficient amount of water or oxygen on its molecular surface, no extra catalyst deactivator may be needed prior to treating the reactor effluent with the solid sorbent.

Separation of the solid sorbent with the residual catalyst absorbed thereon from the liquid product and remaining feedstock is easily accomplished. After the sorbent is mixed with the deactivated effluent, the mixture is passed through a filtering system, see FIG. 4, such as a membrane filter or any commercial filter, which maybe packed with filter aide or other solid material which functions both as filter aide and an additional catalyst sorbent.

One example of a suitable filter is the Funda pressure leaf filter drum which has 21 horizontal filter leafs. The individual filter leafs are precoated with a sorbent prior to introduction of the effluent. Precoating is done with a sorbent slurry which settles on the filter leafs as the slurry vertically flows through the drum. The slurry is a blend of a solid sorbent, which may or may not be identical to the solid sorbent used in the mix tank in the first step of catalyst removal, and a hydrocarbon fluid. The hydrocarbon fluid may be any inert $C_6$ to $C_{30}$ fluid; and is preferably selected to correspond to a fluid that forms part of the feedstock to the reactor or catalyst diluent. In one embodiment, the hydrocarbon fluid used in the sorbent slurry is the same as used in the mix tank and is also unreactive with the sorbent and components of the deactivated effluent stream. Particularly preferred sorbents useful in the filter drum include silica, alumina, activated alumina, di-atomaceous earth filter aid, zeolites of different pore size, MCM41, natural or synthetic clay materials, micro crystalline material or powdered cellulose material with hydroxyl group. These solid sorbent material can be used by itself or mixed with other sorbents to make them more effective. Alternatively, instead of a filter drum, a solid filter bed may be used through which the polymerization effluent is passed through to complete the catalyst filtration.

Filtering may be either a continuous or batch operation. The factors that determine the mode of operation include a) type of filter, b) filter capacity, c) reactor capacity, d) reactor operation mode, and e) sorbant mix tank capacity. After filtering, the filtered liquid flows from a discharge valve at the bottom of the drum. The filtered effluent contains the polyolefin product, unreacted monomer, and hydrocarbon liquids used as diluents in the system, part of the catalyst deactivator, or sorbent slurry liquid. The filtered effluent may also contain inerts introduced via the feedstream or unintentionally generated in the reactor.

As the effluent stream passes through the filter, the residual catalyst is retained in the filter. After a period of time, solids build up on the filter components which then must be removed to continue filtration of the deactivated effluent to remove the inert catalyst; this solid build up is also known as the 'filter cake'. Typically, the filter cake is removed from the filter and the sorbent in the filter cake would then be re-activated and regenerated by calcinations or by washing/drying/calcinations; the reactivated solid sorbent would then be re-used in the system. The washing of the filter cake is typically accomplished by water washing, however, this creates a large amount of waste water in the system.

However, while the filter cake, even after draining the filter of residual liquid comprising unreacted feedstock, diluent, and product, may appear to be dry, due to the highly sorbent nature of the solids, the cake may contain up to 75% liquid. This liquid will have a fractional content equivalent to the liquid exiting the reactor effluent. Thus, if the reactor effluent liquid is 90 vol % product and 10 vol % unreacted feedstock and diluent, the liquid trapped in the solid 'dry' filter cake will be 90 vol % product. In accordance with the present invention, prior to removal of the filter cake from the filter, the filter cake is washed with a wash fluid. The wash fluid is at least one hydrocarbon liquid to 'force' the reaction product out of the filter cake and recover the full amount of reaction product; in effect, reaction product in the filter cake is replaced with the wash fluid, preferably hydrocarbon liquid. The hydrocarbon liquid may be any inert $C_6$ to $C_{30}$ fluid; and is preferably selected to correspond or be the same as a fluid or monomer that forms part of the feedstock to the reactor. The wash fluid contains 90 to 100 vol % of the $C_6$ to $C_{30}$ hydrocarbon fluid and may contain a minor amount of other fluids such as $C_2$-$C_5$ hydrocarbons, or inert liquids such as those in the reactors, or water. In one embodiment, the wash fluid contains no more than 5.0 vol % of water; in another embodiment, the wash fluid contains no more than 1.0 vol % of water; in yet another embodiment, the wash fluid contains no more than 0.1 vol % of water. The liquid drained from the filter during washing is then directed to either a flash drum or distillation column to separate the un-reacted feed olefins, inert solvents and other lighter components from the heavier oligomerization product.

The remaining filter cake solids comprise a blend of inert catalyst material and sorbent, and residual hydrocarbon liquid. The remaining filter cake solid is substantially free of any reaction product polyolefin. Alternatively, the filter cake solid contains not more than 1000 ppm of polyolefin; alternatively, the filter cake solid contains not more than 500 ppm of polyolefin; alternatively, the filter cake solid contains not more than 100 ppm of polyolefin. This remaining solids may be disposed of or the sorbent may be reactivated to remove the inert catalyst and returned to the system for further separation of catalyst from the reactor effluent.

Depending on the polymerization reaction conditions, this oligomerization product may have high degree of unsaturation as measured by bromine number (ASTM D1159 method or equivalent method). If the bromine number is judged too high, the heavy oligomer fraction is subjected to a hydrofinishing step to reduce the bromine number, usually to less than 3 or less than 2 or less than 1, depending on hydrofinishing conditions and the desired application of the PAO base stock. Typical hydrogenation step can be found in many published patents and literatures of PAO production process. Sometimes, when the PAO products have very high molecular weight or hydrogen is used during the polymerization step, the isolated PAO products will naturally have very low brominue number or degree of unsaturation, the product can be used directly in many applications without a separate hydrogenation step.

The light fraction, as separated directly from the reactor effluent or further fractionated from the light fraction contains un-converted alpha-olefins. This light fraction can be recycled with or without any purge, into the polymerization reactor for further conversion into lube product. Or, this fraction as is, or the appropriated fractions, can be recycled into the polymerization reactor, after passing through a feed pre-treatment column containing the typical polar component removing agent, such as activated alumina, molecular sieve, or other active sorbents. This pre-treatment column can remove any of the impurity from the catalyst residue or other impurities. Alternatively, this fraction can be combined with fresh feed olefins before feed purification column.

Product Produced

The oligomerization product comprises a liquid polyolefin product. The types of liquid polyolefins products include ethylene-alpha-olefin copolymer or terpolymer, homopolymers/copolymer/terpolymer of non-ethylene-alpha-olefins, linear alpha-olefin homopolymer, copolymer or terpolymer, etc. Specific examples for these polymers include polyalpha-olefins (PAO), poly-1-decene, copolymer or terpolymer or multi-component liquid polymer of C3 to C24, terpolymer of C8, C10, C12-LAO, copolymer of C6 and C12 or C6 and C14, copolymer of C4 and C12 or C4 and C14, ethylene-propylene copolymer, ethylene-butene copolymer, ethylene-pentene copolymer, ethylene-propylene-butene terperpolymer, ethylene-propylene-hexene terperpolymer, etc.

In another embodiment, any of the polyalpha-olefins described herein have an $M_w$ (weight average molecular weight) of 100,000 or less, preferably between 200 and 80,000, more preferably between 250 and 60,000, more preferably between 280 and 50,000, and most preferably between 336 and 40,000 g/mol. (Preferred $M_w$'s include those from 224 to 55,100, preferably from 392 to 30,000, more preferably 800 to 24,000, and most preferably 2,000 to 37,5000 g/mol. Alternately preferred $M_w$'s include 224 to about 6790, and preferably 224 to about 2720).

In another embodiment, any of the alpha-olefins produced by the method herein have a number average molecular weight ($M_n$) of 50,000 or less, more preferably between 200 and 40,000, more preferably between 250 and 30,000, or most preferably between 500 and 20,000 g/mol. More preferred $M_n$ ranges include 280 to 10,000, 280 to 4,000, 200 to 20,900, 280 to 10,000, 200 to 7000, 200 to 2000, 280 to 2900, 280 to 1700, and 200 to 500.

In another embodiment, any of the polyalpha-olefins produced by the method herein have an $M_w/M_n$ or molecular weight dispersity (MWD) of greater than 1 and less than 5, preferably less than 4, more preferably less than 3, more preferably less than 2.5, and most preferably less than 2.

The $M_w$ and $M_n$ are measured by GPC method using polystyrene as calibration standard. The $M_n$ is correlated with the fluid viscosity according to a power equation $M_n = A \times (V)^B$, where V is kinematic viscosity measured at 100° C. according to the ASTM D 445 method, A and B are constants which vary slightly depending on the type of olefin feeds. For example, when a set PAO made from a mixed feed of 33 wt % $C_6$ and 67 wt % $C_{12}$ LAOs was analyzed by GPC, the relationship of $M_n$ versus 100° C. viscosity was as follows: $M_n = 344.96 \times (V)^{0.4921}$.

In one embodiment of this invention, any PAO produced by the method herein may have a pour point of less than 10° C. (as measured by ASTM D 97). Pour point of any fluid is usually a function of fluid viscosity. Within a class of fluids, usually high viscosity fluids have high pour points, and low viscosity fluids have low pour points. The pour point of the PAOs of this invention have pour points of less than 10° C., preferably less than 0° C., more preferably less than −10° C., more preferably less than −20° C., more preferably less than −25° C., more preferably less than −30° C., more preferably less than −35° C., more preferably less than −50° C., and most preferably less than −70° C.

In another embodiment of this invention, any PAO produced by the method herein may have a kinematic viscosity at 40° C. from about 4 to about 80,000 centi-Stokes (cSt) as measured by ASTM D 445 method, preferably from about 5 cSt to about 50,000 cSt at 40° C.

In another embodiment according to the present invention, any polyalpha-olefin produced by the method herein may have a kinematic viscosity at 100° C. from about 1.5 to about 5,000 centi-Stokes (cSt), preferably from about 2 cSt to about 3,000 cSt, more preferably from about 3 cSt to about 1,000 cSt, and yet more preferably from about 8 cSt to about 500 cSt. The PAOs have viscosities in the range of 2 to 500 cSt at 100° C. in one embodiment, and from 2 to 3000 cSt at 100° C. in another embodiment, and from 3.2 to 300 cS in another embodiment. All viscosities are measured by ASTM D 445 method at 100° C., except when specified at other temperatures.)

Applications

The lubricating oils or grease of the present invention are particularly preferred to be used for the lubrication of rolling element bearings (e.g., ball bearings), gears, circulation lubrication system, hydraulics, compressors used to compress gas (such as reciprocating, rotary and turbo-type air compressors, gas turbine or other process gas compressors) or to compress liquids (such as refrigerator compressors), vacuum pump or metal working machinery, as well as electrical applications, such as for lubrication of electrical switch that produces an electrical arc during on-off cycling or for electrical connectors.

The lubricant or grease components disclosed in this invention are most suitable for applications in industrial machinery where one of more the following characteristics are desirable: wide temperature range, stable and reliable operation, superior protection, extended operation period, energy efficient. The present oils are characterized by an excellent balance of performance properties including superior high and low temperature viscosities, flowability, excellent foam property, shear stability, and improved anti-wear characteristics, thermal and oxidative stability, low friction, low traction. They may find utility as gear oils, bearing oil, circulating oils, compressor oils, hydraulic oils, turbine oils, grease for all kinds of machinery, as well as in other applications, for example, in wet clutch systems, blower bearings, wind turbine gear box, coal pulverizer drives, cooling tower gearboxes, kiln drives, paper machine drives and rotary screw compressors.

Kinematic Viscosity (KV) was measured according to ASTM D445 at the temperature indicated (e.g., 100° C. or −40° C.).

Viscosity Index (VI) was determined according to ASTM D-2270.

Noack volatility was determined according to the ASTM D5800 method, with the exception that the thermometer calibration is performed annually rather than biannually.

Pour point was determined according to ASTM D5950.

Oligomer distribution was determined by using the Hewlett Packard (HP) 5890 Series II Plus GC, equipped with flame ionization detector (FID) and capillary column.

Unless stated otherwise herein, the meanings of terms used herein shall take their ordinary meaning in the art; and reference shall be taken, in particular, to Synthetic Lubricants and High-Performance Functional Fluids, Second Edition, Edited by Leslie R. Rudnick and Ronald L. Shubkin, Marcel Dekker (1999). This reference, as well as all patents and patent applications, test procedures (such as ASTM methods and the like), and other documents cited herein are fully incorporated by reference to the extent such disclosure is not inconsistent with this invention and for all jurisdictions in which such incorporation is permitted. Note that Trade Names used herein are indicated by a ™ symbol or ® symbol, indicating that the names may be protected by certain trademark rights, e.g., they may be registered trademarks in various jurisdictions. Note also that when numerical lower limits and numerical upper limits are listed herein, ranges from any lower limit to any upper limit are contemplated.

What is claimed:

1. A process for preparing at least one liquid polyolefin, the process comprising:
   a) contacting a feedstock comprising a mixture of $C_6$ to $C_{14}$ alpha-olefin monomers with a catalyst system comprising at least one activated metallocene catalyst in a polymerization reactor to produce an effluent stream comprising said at least one liquid polyolefin, residual catalyst, and unreacted alpha-olefin monomers, wherein from 50% to 95% of the alpha-olefin monomers are converted;
   b) contacting the effluent stream with at least one deactivator to produce a deactivated effluent stream;
   c) contacting the deactivated effluent stream with at least one sorbent to absorb residual catalyst to produce a deactivated effluent stream containing the at least one sorbent and the residual catalyst;
   d) filtering the deactivated effluent stream containing the at least one sorbent and the residual catalyst through a filter, wherein the filtering creates (i) a filtered effluent comprising a first portion of said at least one liquid polyolefin and (ii) a filter cake comprising the at least one sorbent, the residual catalyst, and a second portion of the at least one liquid polyolefin;
   e) washing the filter cake in the filter with a wash fluid comprising at least one alpha-olefin which corresponds to one of the alpha-olefin monomers in said mixture of $C_6$ to $C_{14}$ alpha-olefin monomers, to produce a washed filter cake containing no more than 1000 ppm of the at least one liquid polyolefin and a fluid mixture which contains a third portion of the at least one liquid polyolefin, wherein the amount of the at least one liquid polyolefin in the third portion is less than or equal to the amount of the at least one liquid polyolefin in the second portion; and
   f) removing the fluid mixture from the filter cake and recovering at least a portion of the third portion of the at least one liquid polyolefin from the fluid mixture.

2. The process of claim 1, wherein the wash fluid contains no more than 5.0 vol % of water.

3. The process of claim 1, wherein the washed filter cake contains no more than 100 ppm of the at least one liquid polyolefin.

4. The process of claim 1, wherein the fluid mixture removed from the filter cake comprises at least a portion of the unreacted alpha-olefin monomers and the at least one alpha-olefin used to wash the filter cake, and wherein said recovering at least a portion of the third portion of the at least one liquid polyolefin from the fluid mixture further comprises distilling the fluid mixture to separate the unreacted alpha-olefin monomers, the at least one alpha-olefin used to wash the filter cake, and at least a portion of the third portion of the at least one liquid polyolefin.

5. The process of claim 1, wherein the fluid mixture removed from the filter cake further comprises the at least one alpha-olefin used to wash the filter cake, and wherein the at least one alpha-olefin used to wash the filter cake contained in the fluid mixture and the unreacted alpha-olefin monomers are recycled to the polymerization reactor.

6. The process of claim 1, wherein the activated metallocene catalyst is a single site metallocene catalyst and wherein the catalyst system further comprises, an NCA activator and a trialkyl aluminum co-activator.

7. The process of claim 1, wherein the at least one sorbent is capable of chemically and physically interacting with the residual catalyst.

8. The process of claim 1, wherein the polymerization reactor is a tank reactor comprising at least one spray nozzle and a recirculating pump, and wherein the tank reactor comprises no internal agitator.

9. The process of claim 1, wherein the at least one deactivator comprises at least one of air, $CO_2$, water, and mixtures thereof.

10. A lubricant made by the process of claim 1, wherein the lubricant is a gear oil, bearing oil, circulating oil, compressor oil, hydraulic oil, turbine oil, or machinery grease.

* * * * *